US011145920B2

(12) United States Patent
Zhang et al.

(10) Patent No.: US 11,145,920 B2
(45) Date of Patent: Oct. 12, 2021

(54) UNIT BODY OF METAL AIR BATTERY AND ITS INTELLIGENT CONTROL SYSTEM

(71) Applicant: BEIJING YIYUAN NEW ENERGY TECHNOLOGY CO., LTD, Beijing (CN)

(72) Inventors: Shuxiong Zhang, Beijing (CN); Lei Hong, Beijing (CN); Yunfan Zhang, Beijing (CN)

(73) Assignee: BEIJING YIYUAN NEW ENERGY TECHNOLOGY CO., LTD, Beijing (CN)

( * ) Notice: Subject to any disclaimer, the term of this patent is extended or adjusted under 35 U.S.C. 154(b) by 210 days.

(21) Appl. No.: 16/139,045

(22) Filed: Sep. 23, 2018

(65) Prior Publication Data

US 2019/0207281 A1    Jul. 4, 2019

(51) Int. Cl.
*H01M 4/36*         (2006.01)
*H01M 12/02*        (2006.01)
(Continued)

(52) U.S. Cl.
CPC ........ *H01M 12/02* (2013.01); *H01M 10/4214* (2013.01); *H01M 12/065* (2013.01); *H01M 12/08* (2013.01); *H01M 50/10* (2021.01); *H01M 50/1385* (2021.01); *H01M 50/183* (2021.01); *H01M 2220/20* (2013.01)

(58) Field of Classification Search
CPC .... H01M 12/02; H01M 12/065; H01M 12/08; H01M 2/024; H01M 2/0255; H01M 2/08; H01M 10/4214; H01M 2220/20
See application file for complete search history.

(56) References Cited

U.S. PATENT DOCUMENTS

2015/0171495 A1* 6/2015 Yadgar ................. H01M 12/08
429/403

* cited by examiner

*Primary Examiner* — Jane J Rhee
(74) *Attorney, Agent, or Firm* — Houtteman Law LLC

(57) ABSTRACT

The invention discloses a unit body of metal air battery, which can solve the problem of the nonuniformity of velocity in the electrolyte, ensure the internal electrolyte uniformly distributed, the residue in a cavity of a battery can be carried away fully in the electrolyte circulation and reflow process, injecting electrolyte in the whole metal air batteries can be realized only by a set of water injection equipment, greatly save the cost of manpower and material resources. The upper center of a housing has an upper hole and the lower center of a housing has a bottom hole. There is a slope inclined toward the inside in a cavity. There is a lower through hole at the lowest end of a slope. A lower through hole is communicated with a bottom hole of a housing. Both sides of a bottom hole and an upper hole have a mating surface groove, in which a sealing ring of a housing is placed. An upper sealing ring is fixed on a sealing plug. A sealing plug, an alloy plate, and an upper copper electrode are connected by a screw of an alloy plate. A battery cover is covered with a sealing plug. The middle of a sealing plug is provided with a middle hole corresponding to an upper hole of a housing, in which there is a downward upper through hole. When a sealing plug is inserted into the upper part of a housing, a closed space is formed inside a housing. The electrolyte is circulated and discharged by an upper through hole and a lower through hole. An intelligent control system having this unit body of metal air battery is also provided.

9 Claims, 4 Drawing Sheets

(51) Int. Cl.
*H01M 12/08* (2006.01)
*H01M 12/06* (2006.01)
*H01M 10/42* (2006.01)
*H01M 50/10* (2021.01)
*H01M 50/183* (2021.01)
*H01M 50/138* (2021.01)

UNIT BODY OF METAL AIR BATTERY AND ITS INTELLIGENT CONTROL SYSTEM

FIELD OF THE INVENTION

The present invention relates to the technical field of a new energy battery, and particularly relates to a unit body of metal air battery, and an intelligent control system having this unit body of metal air battery.

BACKGROUND OF THE INVENTION

The unit body of a metal air battery (ie, a single metal air battery) is a chemical power that produces electrical power by chemical reaction under the catalysis of catalyst, taking the oxygen in the air as a positive active substance, taking the metal as a negative active substance, and using the conductive solution as the electrolyte.

Metal air battery has many unique advantages. Its fuel is metal material, such as aluminum, magnesium, zinc, lithium and sodium. Because of the abundant reserves of fuel such as aluminum, magnesium and zinc, the metal air fuel cell resources can be fully supplied. The positive active substance is the oxygen in the air, and the cell itself does not need to carry. The size of energy carried by the cell is determined by the amount of metal as a negative pole, which makes the actual rate energy of this cell can reach more than 350 Wh/kg (the current lithium ion battery for 100 Wh/kg), with great performance advantages. The products after reaction can be reelectrolyzed aluminum oxide (or magnesium hydroxide) into metal by using wind energy, solar energy, water energy and other clean energy or electric energy in the rich area, then reinstalled into metal air fuel cell to discharge, driving the electric vehicle. This can be achieved on the large scale production, can reduce pollution, reduce emissions, and can realize the centralized power supply, decentralized, low cost power will be transferred to the place in the high cost of local power, and power will be transferred from easy access to difficult to obtain. A new car life of zero pollution and zero emissions can be truly achieved. In the process, the free pollution is achieved, and green energy of zero emission is recycled. Metal air batteries are becoming more and more important in the world.

The current metal air battery is usually assembled by a number of unit bodies. Each unit body has a cavity consisting of an air electrode and a metal plate (for example, a magnesium plate, an alloy plate, etc.). The electrolyte (for example, water) is injected into the upper side of a cavity, and then the reacting residue is discharged from the lower diagonal side of a cavity. Every two units are isolated, and the electrolyte needs to be injected separately. However, the chemical reaction of an air electrode and a metal plate in each unit body of a metal air battery having this structure is inadequate. Some electrolyte far from the upper side of a cavity can't reach, therefore, there is no electrochemical reaction that can not produce electrical energy. The reacting residue is discharged from the lower diagonal side of a cavity. The reaction residue far from the lower diagonal side of a cavity is difficult to be discharged. Every two units are isolated, and need be injected into the electrolyte respectively, which greatly costs manpower and material resources.

SUMMARY OF THE INVENTION

For the above technical problem, the present invention provides a unit body of metal air battery, which can solve the problem of the nonuniformity of velocity in the electrolyte, ensure the internal electrolyte uniformly distributed, the residue in a cavity of a battery can be carried away fully in the electrolyte circulation and reflow process, injecting electrolyte in the whole metal air batteries can be realized only by a set of water injection equipment, greatly save the cost of manpower and material resources.

The technical solution of the present invention is, the unit body of metal air battery comprises a housing (1), a front cover (2), an air electrode (3), an alloy plate (4), an upper sealing ring (5), an upper copper electrode (6), a battery cover (7), a screw of an alloy plate (8), a sealing plug (9), a back cover (10), a screw of electrode (11), a sealing ring of a housing (12).

The front part of a housing (1) is sealed by the bonding of a front cover (2) and an air electrode (3) to form a cavity between a housing and the bonded front cover and an air electrode. The rear part of a housing is sealed by the bonding of a back cover (10) and an air electrode (3) to form a cavity between a housing and the bonded back cover and an air electrode.

A copper electrode derived from the air battery and an upper copper electrode (6) correspond to a side hole of a housing, are fixed by a screw of electrode (11).

The upper center of a housing has an upper hole and the lower center of a housing has a bottom hole. There is a slope inclined toward the inside in a cavity. There is a lower through hole (14) at the lowest end of a slope. A lower through hole is communicated with a bottom hole of a housing. Both sides of a bottom hole and an upper hole have a mating surface groove (e), in which a sealing ring of a housing (12) is placed. An upper sealing ring (5) is fixed on a sealing plug (9). A sealing plug, an alloy plate (4), and an upper copper electrode (6) are connected by a screw of an alloy plate (8). A battery cover (7) is covered with a sealing plug. The middle of a sealing plug is provided with a middle hole corresponding to an upper hole of a housing, in which there is a downward upper through hole. When a sealing plug is inserted into the upper part of a housing, a closed space is formed inside a housing. The electrolyte is circulated and discharged by an upper through hole and a lower through hole.

Because the upper center of a housing has an upper hole and the lower center of a housing has a bottom hole, a lower through hole is communicated with a bottom hole of a housing, an upper through hole is communicated with an upper hole of a housing, therefore when the electrolyte is injected, it uniformly diffuses upwards from the center of the bottom, which can solve the problem of the nonuniformity of velocity in the electrolyte, ensure the internal electrolyte uniformly distributed. When the reacting residue is discharged, the liquid is injected from an upper hole and uniformly diffuses downwards evenly. Therefore, the residue in a cavity of a battery can be carried away fully in the electrolyte circulation and reflow process. Because there is a slope inclined toward the inside in a cavity, there is a lower through hole at the lowest end of a slope, a lower through hole is communicated with a bottom hole of a housing, the middle of a sealing plug is provided with a middle hole corresponding to an upper hole of a housing, in which there is a downward upper through hole, when a sealing plug is inserted into the upper part of a housing, a closed space is formed inside a housing, the electrolyte is circulated and discharged by an upper through hole and a lower through hole, therefore injecting electrolyte in the whole metal air batteries can be realized only by a set of water injection equipment, greatly save the cost of manpower and material resources.

An intelligent control system having this unit body of metal air battery is also provided. A control center (A14) makes a second self suction pump (6.2) start. The electrolyte in an electrolyte tank (A2) flows back to an electrolyte tank (A2) via a fourth pipeline outlet (丁), a second self suction pump (6.2), a fourth tee (B4), a radiator (A12), a sixth tee (B6), a fifth electromagnetic valve (3.5), an eighth tee (B8), batteries (A9), a ninth tee (B9), a seventh tee (B7), a third electromagnetic valve (3.3), a fifth tee (B5), a third tee (B3), a third pipeline outlet (丙). When the electrolyte is passed through batteries (A9), batteries produce electrical energy and output a current to the outside, then trigger a fan of batteries (A8) and a vent fan (A11) start.

In the present invention, the action of the related parts is triggered by a control center, and the electrolyte flows through batteries to produce electric energy and output a current. It triggers a fan of batteries (A8) and a vent fan (A11) start to radiate. Therefore, the intelligent control system having this unit body of metal air battery has realized the requirement of repeated use of metal air batteries under good conditions, can automatically control the operation of metal air batteries. The system has the characteristics of high energy density, safe and environmental protection, low cost and easy to use.

DETAILED DESCRIPTION OF THE PREFERRED EMBODIMENTS

Figure 1:
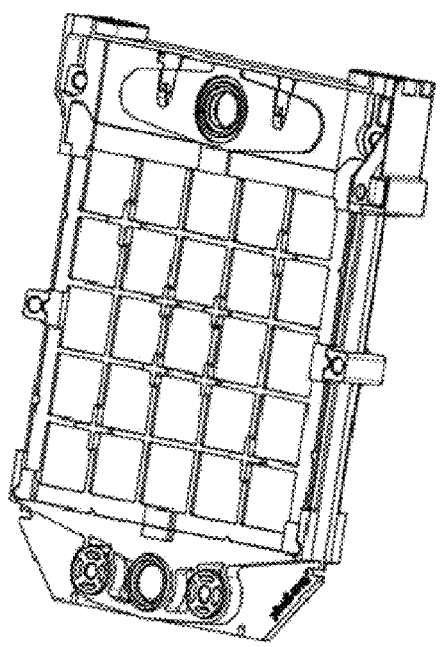
FIG. 1 is a schematic view of the whole structure of a unit body of metal air battery according to the present invention.
Figure 2:
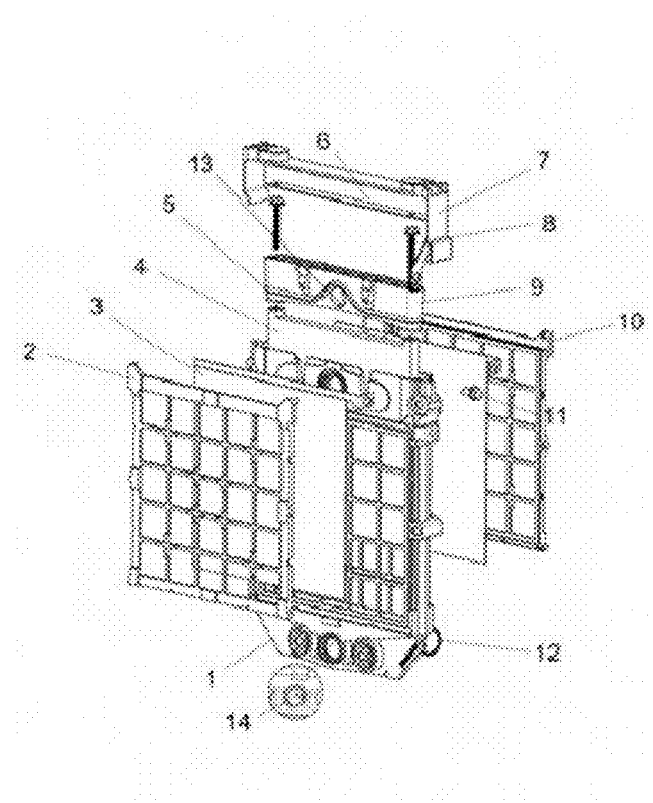
FIG. 2 is a schematic view of the split structure of a unit body of metal air battery according to the present invention.
Figure 3:
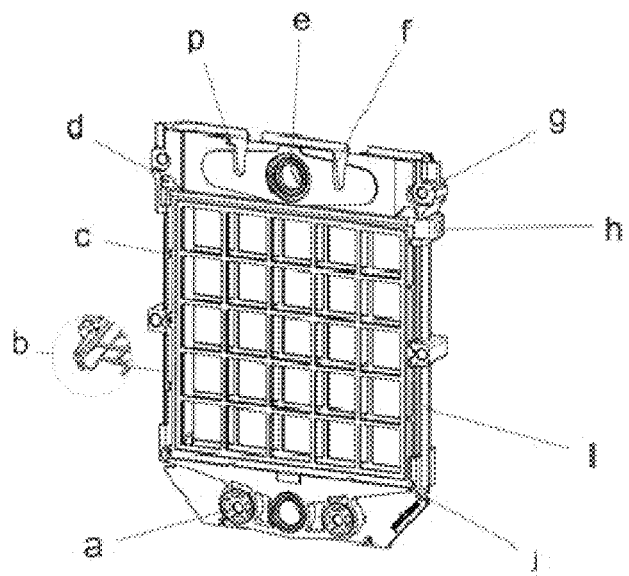
FIG. 3 is a schematic view of some parts of a unit body of metal air battery according to the present invention, mainly showing a housing.
Figure 4:
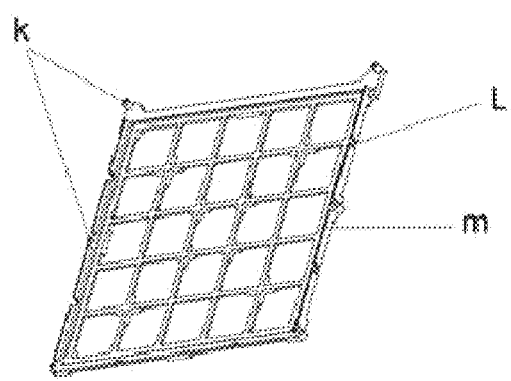
FIG. 4 is a schematic view of a front cover of a unit body of metal air battery according to the present invention.
Figure 5:
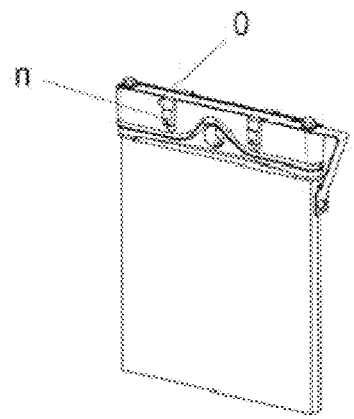
FIG. 5 is a schematic view of some parts of a unit body of metal air battery according to the present invention, mainly showing a sealing plug.
Figure 6:
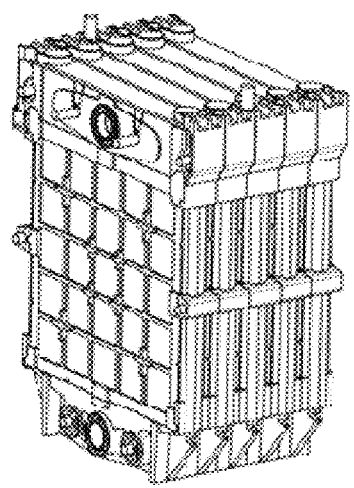
FIG. 6 is a schematic view of a unit body of metal air battery according to the present invention after grouping.

As shown as FIG. 1-3, this unit body of metal air battery comprises a housing 1, a front cover 2, an air electrode 3, an alloy plate 4, an upper sealing ring 5, an upper copper electrode 6, a battery cover 7, a screw of an alloy plate 8, a sealing plug 9, a back cover 10, a screw of electrode 11, a sealing ring of a housing 12.

The front part of a housing 1 is sealed by the bonding of a front cover 2 and an air electrode 3 to form a cavity between a housing and the bonded front cover and an air electrode. The rear part of a housing is sealed by the bonding of a back cover 10 and an air electrode 3 to form a cavity between a housing and the bonded back cover and an air electrode.

A copper electrode derived from the air battery and an upper copper electrode 6 correspond to a side hole of a housing, are fixed by a screw of electrode 11.

The upper center of a housing has an upper hole and the lower center of a housing has a bottom hole. There is a slope inclined toward the inside in a cavity. There is a lower through hole 14 at the lowest end of a slope. A lower through hole is communicated with a bottom hole of a housing. Both sides of a bottom hole and an upper hole have a mating surface groove e, in which a sealing ring of a housing 12 is placed. An upper sealing ring 5 is fixed on a sealing plug 9. A sealing plug, an alloy plate 4, and an upper copper electrode 6 are connected by a screw of an alloy plate 8. A battery cover 7 is covered with a sealing plug. The middle of a sealing plug is provided with a middle hole corresponding to an upper hole of a housing, in which there is a downward upper through hole. When a sealing plug is inserted into the upper part of a housing, a closed space is formed inside a housing. The electrolyte is circulated and discharged by an upper through hole and a lower through hole.

Because the upper center of a housing has an upper hole and the lower center of a housing has a bottom hole, a lower through hole is communicated with a bottom hole of a housing, an upper through hole is communicated with an upper hole of a housing, therefore when the electrolyte is injected, it uniformly diffuses upwards from the center of the bottom, which can solve the problem of the nonuniformity of velocity in the electrolyte, ensure the internal electrolyte uniformly distributed. When the reacting residue is discharged, the liquid is injected from an upper hole and uniformly diffuses downwards evenly. Therefore, the residue in a cavity of a battery can be carried away fully in the electrolyte circulation and reflow process. Because there is a slope inclined toward the inside in a cavity, there is a lower through hole at the lowest end of a slope, a lower through hole is communicated with a bottom hole of a housing, the middle of a sealing plug is provided with a middle hole corresponding to an upper hole of a housing, in which there is a downward upper through hole, when a sealing plug is inserted into the upper part of a housing, a closed space is formed inside a housing, the electrolyte is circulated and discharged by an upper through hole and a lower through hole, therefore injecting electrolyte in the whole metal air batteries can be realized only by a set of water injection equipment, greatly save the cost of manpower and material resources.

Preferably, the inclination angle of the said slope is 5 to 45 degrees.

Preferably, as shown as FIG. 3, there are two small locating holes on both sides of a middle hole of the said sealing plug. The upper part of a small positioning hole is provided with a rib meshing with a groove on an upper part of a housing 1, and this rib is used to locate the spacing of a sealing plug after grouping the unit bodies. The upper end of a sealing plug is pressed and flush with a housing. There is a groove just accommodated a slot of a screw of an alloy plate respectively in the two ends of a battery cover 7. There is a locating hole respectively in the two sides of a sealing plug. By a bolt passing through a locating hole, a slipknot bolt is fixed on the top. By fixing a slipknot bolt and a top pressing plate, a sealing plug and a housing are pressed flushed and tight to achieve accurate location. There is a locating protruding with a locating point on the two sides of a sealing plug. The gap between unit bodies is defined by a locating point in the assembly. A locating point is compressed after pretightening a bolt in a locating hole, so that an upper hole of a housing and an upper sealing ring on a sealing plug are fully pressed.

Preferably, as shown as FIG. 3, the left and right of a lower hole of a housing respectively has a fixed hole a, which is pretighten by a bolt passing through after unit bodies are grouped. There is a U-shaped groove f in the upper part of a housing, which is matched with a protruding on a sealing plug to achieve the group placement and removal of a battery alloy plate. The lower part of a housing is reserved for fixing a fixed slot j of a housing.

Preferably, as shown as FIG. 3,5, there is a groove p on one side of a U-shaped groove f. During the assembly process of an alloy plate, a groove p is matched with a protruding o located on a sealing plug, and a groove p and a protruding o are arranged diagonally in their corresponding parts. Such design enables a sealing plug 9 to be positioned in the process of downwards assembly, and enables the product not to distinguish front and back, in order to be more flexible in the assembly process.

Preferably, as shown as FIG. 2,6, the two sides of a battery cover 7 extend downwards and fasten a housing. A battery cover has a tile shaped lap at an extending end of an upper copper electrode. A battery cover is formed a layers stacked state after grouping, which can effectively prevent the liquid from splashing a circuit.

Preferably, as shown as FIG. 3, A fixed hole h is set on the side of a housing, and an air electrode 3 and an upper copper electrode 6 are fixed at a fixed hole h. A fixed hole h is used to fix an air electrode 3 and an upper copper electrode 6 by a preburied bolt, a hot melt nut or self tapping, and so on.

Preferably, as shown as FIG. 3,4, the front and back surfaces of a housing are grille. The side of the grille has a gumming slot b encircling the grid, and the adhesive for bonding a battery housing 1 and a battery cover plate 2 is provided in a gumming slot b. An inner convex c of a cavity is on the outside of a gumming slot b, which is used to locate an air electrode on a housing. A groove L is matched with an inner convex c of a cavity. There is a bias strip m on the outer edge of the inside of a front cover and a back cover, which is used to produce a cavity for coating with adhesive in the assembly of a housing, ie. engage with a gumming slot b and bond by bonding adhesive.

Preferably, as shown as FIG. 3, there is a prismatic protruding I on the edge of a housing, which is used to improve the flow of side wind and strengthen side edge strength at the same time.

Preferably, as shown as FIG. 3,4, a locating hole d is set on a gumming slot b and an inner groove of a housing, which is engaged with a locating pin k.

The beneficial effects of the invention are as follows.
1. Compared with the prior art, by the redesign of the liquid circuit in a battery, the problem of uneven flow of the electrolyte between the products is improved, the distribution of the internal electrolyte is even, and the residue of a battery cavity can be fully taken away in the process of electrolyte circulation and reflux.
2. The fixing mode between a battery cover plate 2 and a battery cover plate 1 is improved, to improve the rate of good quality.
3. The rapid replacement of an alloy plate electric core of a metal air battery has been realized, which shorten the time of the replacement of an electric core and improve the working efficiency.
4. A more convenient and fast grouping way makes the parameters of a product have more expansibility.

Figure 7:
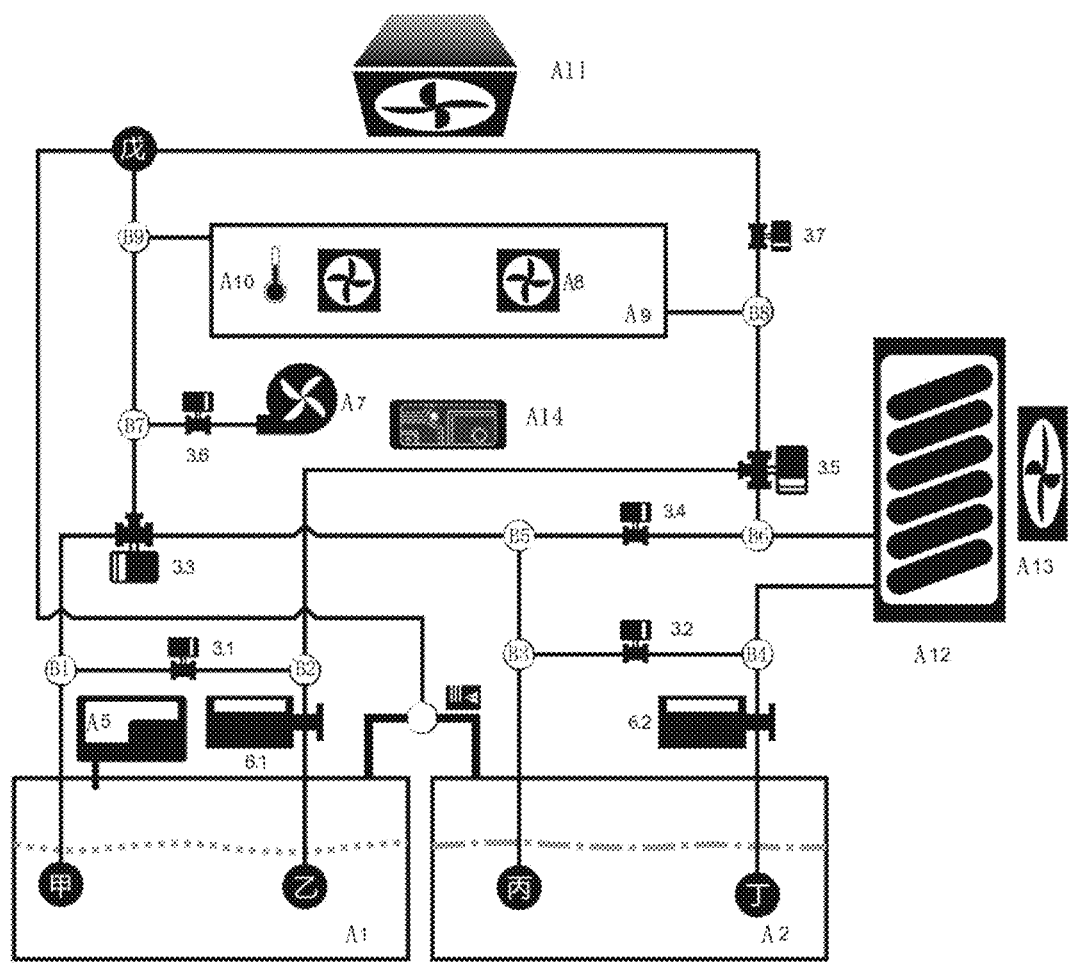
FIG. 7 is a schematic view of the whole structure of an intelligent control system having this unit body of metal air battery according to the present invention.

As shown as FIG. 7, an intelligent control system having this unit body of metal air battery is also provided. According to an external signal, the system is started manually or automatically. The first process of starting the system is the open state of a fifth electromagnetic valve 3.5 and a third electromagnetic valve 3.3, and the closed state of the rest electromagnetic valves. A control center A14 makes a second self suction pump 6.2 start. The electrolyte in an electrolyte tank A2 flows back to an electrolyte tank A2 via a fourth pipeline outlet 丁, a second self suction pump 6.2, a fourth tee B4, a radiator A12, a sixth tee B6, a fifth electromagnetic valve 3.5, an eighth tee B8, batteries A9, a ninth tee B9, a seventh tee B7, a third electromagnetic valve 3.3, a fifth tee B5, a third tee B3, a third pipeline outlet 丙. When the electrolyte is passed through batteries A9, batteries produce electrical energy and output a current to the outside, then trigger a fan of batteries A8 and a vent fan A11 start.

In the present invention, the action of the related parts is triggered by a control center, and the electrolyte flows through batteries to produce electric energy and output a current. It triggers a fan of batteries A8 and a vent fan A11 start to radiate. Therefore, the intelligent control system having this unit body of metal air battery has realized the requirement of repeated use of metal air batteries under good conditions, can automatically control the operation of metal air batteries. The system has the characteristics of high energy density, safe and environmental protection, low cost and easy to use.

In this process, a battery produces heat during the continuous discharge. This heat will make the electrolyte warm up gradually.

Preferably, the said batteries 9 are provided with a temperature sensor A10, which is used to detect the temperature of the said batteries real time. When the temperature reaches the specified value, a radiator fan A13 on a radiator A12 is started, and the heat dissipation effect is strengthened.

Preferably, when the temperature reaches the defined temperature, a control center A14 stops a second self suction pump 6.2. The hydrogen produced in batteries 9 in the discharge process is discharged from batteries 9, a ninth tee B9, a fifth pipeline outlet 戊, and then discharged from a vent fan A11 to the outside of the system.

According to an external signal or the time limit of its own working time, the system stops an output current. At this time a self suction pump stops working, and a radiator fan outside batteries system will stop working. Preferably, after a control center A14 stops a second self suction pump 6.2, the liquid in a pipeline will be reflux according to gravity action, thus ending the reaction within batteries 9. In this process, in order to ensure the liquid in the internal pipeline and batteries can be completely discharged, the liquid deposited in a radiator A12 flows back to an electrolyte tank A2 through a fourth tee B4, a second electromagnetic valve 3.2 opened, a third tee B3, a third pipeline outlet 丙, or the liquid deposited in a radiator A12 flows back to an electrolyte tank A2 through a sixth tee B6, a fourth electromagnetic valve 3.4 opened, a fifth tee B5, a third tee B3, a third pipeline outlet 丙.

After the battery system is discharged in a previous discharge process, there is a high concentration of alkaline electrolyte residual in the system. In order to ensure the service life of the system, it is necessary to use the cleaning liquid inside a cleaning liquid tank A1 to clean the system.

Preferably, the intelligent metal air battery system also includes a cleaning liquid tank A1. After all the electrolyte is flowed back to an electrolyte tank A2, a control center A14 starts a first self suction pump 6.1. The cleaning liquid is exported through a second pipeline outlet 乙, a first self suction pump 6.1, a second tee B2, a fifth electromagnetic valve 3.5, an eighth tee B8, batteries 9, a ninth tee B9, a seventh tee B7, a third electromagnetic valve 3.3, a first tee B1, a first pipeline outlet 甲, and the cleaning operation is completed.

Preferably, the intelligent metal air battery system also includes a neutralizing device A5, which is connected to a cleaning liquid tank A1. In the process of circulation of cleaning liquid, the neutral cleaning liquid will gradually tend to alkaline because it dilutes alkali liquid in the system, therefore a neutralizing device A5 need continue neutralizing operation, to make the cleaning liquid maintain a neutral state. Until the neutralization operation is not carried out, the alkalinity of the cleaning liquid is no longer added, indicating the completion of the cleaning operation.

Preferably, after the cleaning operation, the cleaning liquid will be reflux to a cleaning liquid tank A1 according to gravity action, through an eighth tee B8, a fifth electromagnetic valve 3.5, a second tee B2, a first electromagnetic valve 3.1, a first tee B1, a first pipeline outlet 甲, or the cleaning liquid will be reflux to a cleaning liquid tank A1 according to gravity action, through a seventh tee B7, a third electromagnetic valve 3.3, a first tee B1, a first pipeline outlet 甲.

After cleaning the system by the cleaning liquid, the internal channel of the system and the inside of batteries 9 are in a wet state. In order to improve the service life, it is necessary to keep the inside of batteries 9 be dry, so it is necessary to blow dry.

Preferably, a control center A14 opens a first electromagnetic valve 3.1.

Preferably, a sixth electromagnetic valve 3.6 is connected to one end of a seventh tee B7, and a sixth electromagnetic valve 3.6 is connected to a blower A7. In the operation of blowing dry, a control center A14 opens a sixth electromagnetic valve 3.6 and the rest valves are closed. When a blower A7 is opened, the wind is discharged through a blower A7, a sixth electromagnetic valve 3.6, a seventh tee B7, a ninth tee B9, batteries 9, an eighth tee B8, a seventh electromagnetic valve 3.7, and a fifth pipeline outlet 戊. It continues to blow dry, and a blower stops working. All valves are closed and the system is in a standby state.

The above stated is only preferable embodiments of the present invention, and it should be noted that the above preferable embodiments do not limit the present invention. The claimed scope of the present invention should be based on that defined by the claims. For a skilled person in this technical field, without departing from spirit and scope of the present invention, any improvement and amendment can be made, and these improvement and amendment should belong to the claimed scope of the present invention.

The invention claimed is:

1. An intelligent control system having a metal air battery unit, comprising:
   a cleaning liquid tank (A1) containing cleaning liquid, the cleaning liquid tank (A1) including a first pipeline outlet and a second pipeline outlet;
   an electrolyte tank (A2) containing electrolyte, the electrolyte tank (A2) including a third pipeline outlet and a fourth pipeline outlet;
   a first tee (B1) being connected between the first pipeline outlet and a first electromagnetic valve (3.1);
   a second tee (B2) being connected between a first self suction pump (6.1) and the first electromagnetic valve (3.1), the first self suction pump (6.1) being connected being connected between the second tee (B2) and the second pipeline outlet;
   a third tee (B3) being connected to the third pipeline outlet, and the third tee (B3) being further connected to a fourth tee (B4) through a second electromagnetic valve (3.2), the fourth tee (B4) being connected to the fourth pipeline outlet through a second self suction pump (6.2), the fourth tee (B4) being further connected to a radiator (A12);
   a sixth tee (B6) being connected to the radiator (A12), the sixth tee (B6) being further connected to a fifth tee (B5) through a fourth electromagnetic valve (3.4), the sixth tee (B6) being further connected to an eighth tee (B8) through a fifth electromagnetic valve (3.5);
   the eighth tee (B8) being further connected to batteries (A9), which includes a fan (A8), batteries (A9) being further connected to fifth pipeline outlet through a ninth tee (B9), the ninth tee (B9) being connected to a seventh tee (B7), the seventh tee (B7) being further connected to a third electromagnetic valve (3.3), the third electromagnetic valve (3.3) being further connected to fifth tee (B5), the third electromagnetic valve (3.3) being further the first pipeline outlet of the cleaning liquid tank (A1); and a control center (A14) for switching on or of the electromagnetic valves;
   wherein the control center (A14) switches on the second self suction pump (6.2), the electrolyte in the electrolyte tank (A2) flows through the fourth pipeline outlet, the second self suction pump (6.2), the fourth tee (B4), the radiator (A12), the sixth tee (B6), the fifth electromagnetic valve (3.5), the eighth tee (B8), the batteries (A9), the ninth tee (B9), the seventh tee (B7), the third electromagnetic valve (3.3), the fifth tee (B5), the third tee (B3), and the third pipeline outlet of the electrolyte tank (A2), when the electrolyte is passed through batteries (A9), batteries produce electrical energy and output a current to the outside, then trigger the fan (A8) of batteries, and a vent fan (A11) starts.

2. The intelligent control system according to the claim 1, wherein the batteries (9) are provided with a temperature sensor (A10), which is used to detect the temperature of the batteries in real time, when the temperature reaches a pre-determined value, a radiator fan (A13) on the radiator (A12) is started, and the heat dissipation effect is strengthened.

3. The intelligent control system according to the claim 2, wherein when the temperature reaches a pre-determined temperature, the control center (A14) switch off the second self suction pump (6.2), hydrogen produced in batteries (9) in the discharge process is discharged through the batteries (9), the ninth tee (B9), and the fifth pipeline outlet, and then discharged from a vent fan (A11) to the outside of the system.

4. The intelligent control system according to the claim 3, wherein after the control center (A14) switches off the second self suction pump (6.2), liquid in a pipeline will be reflux according to gravity action, thus ending reaction within batteries (9), in order to ensure the liquid in the pipeline and batteries can be completely discharged, the liquid deposited in the radiator (A12) flows back to the electrolyte tank (A2) through the fourth tee (B4), the second electromagnetic valve (3.2), the third tee (B3), and the third pipeline outlet, or the liquid deposited in the radiator (A12) flows back to the electrolyte tank (A2) through the sixth tee (B6), the fourth electromagnetic valve (3.4), the fifth tee (B5), the third tee (B3), and the third pipeline outlet.

5. The intelligent control system according to the claim 4, wherein after all the electrolyte is flowed back to the electrolyte tank (A2), the control center (A14) switches on the first self suction pump (6.1), the cleaning liquid is exported through the second pipeline outlet, the first self suction pump (6.1), the second tee (B2), the fifth electromagnetic valve (3.5), the eighth tee B8, the batteries (9), the ninth tee (B9), the seventh tee (B7), the third electromagnetic valve (3.3), the first tee (B1), and the first pipeline outlet, and a cleaning operation is completed.

6. The intelligent control system according to the claim 5, further comprising a neutralizing device (A5), which is connected to the cleaning liquid tank (A1).

7. The intelligent control according to the claim 6, wherein after the cleaning operation, the cleaning liquid will be reflux to the cleaning liquid tank (A1) according to gravity action, through the eighth tee (B8), the fifth electromagnetic valve (3.5), the second tee (B2), the first electromagnetic valve (3.1), the first tee (B1), the first pipeline outlet, or the cleaning liquid will be reflux to the cleaning liquid tank (A1) according to gravity action, through the seventh tee (B7), the third electromagnetic valve (3.3), the first tee (B1), and the first pipeline outlet.

8. The intelligent control system according to the claim 7, wherein the control center (A14) switches on the first electromagnetic valve (3.1).

9. The intelligent control system according to the claim 8, wherein the sixth electromagnetic valve (3.6) is connected to a blower (A7), during a blowing dry operation, the control center (A14) switches on the sixth electromagnetic valve (3.6) and the rest valves are switched off, when the blower (A7) is switched on, wind is discharged through the blower (A7), the sixth electromagnetic valve (3.6), the seventh tee (B7), the ninth tee (B9), the batteries (9), the eighth tee (B8), the seventh electromagnetic valve (3.7), and the fifth pipeline outlet.

* * * * *